July 18, 1967 J. J. HICKEY 3,331,968

HIGH SPEED GATING CIRCUIT

Filed Aug. 24, 1964

INVENTOR:
JOHN J. HICKEY,
BY Jerry A. Dinardo
AGENT.

United States Patent Office 3,331,968
Patented July 18, 1967

3,331,968

HIGH SPEED GATING CIRCUIT

John J. Hickey, Hawthorne, Calif., assignor to TRW Inc., a corporation of Ohio

Filed Aug. 24, 1964, Ser. No. 391,412
10 Claims. (Cl. 307—88.5)

Figures 1, 2:
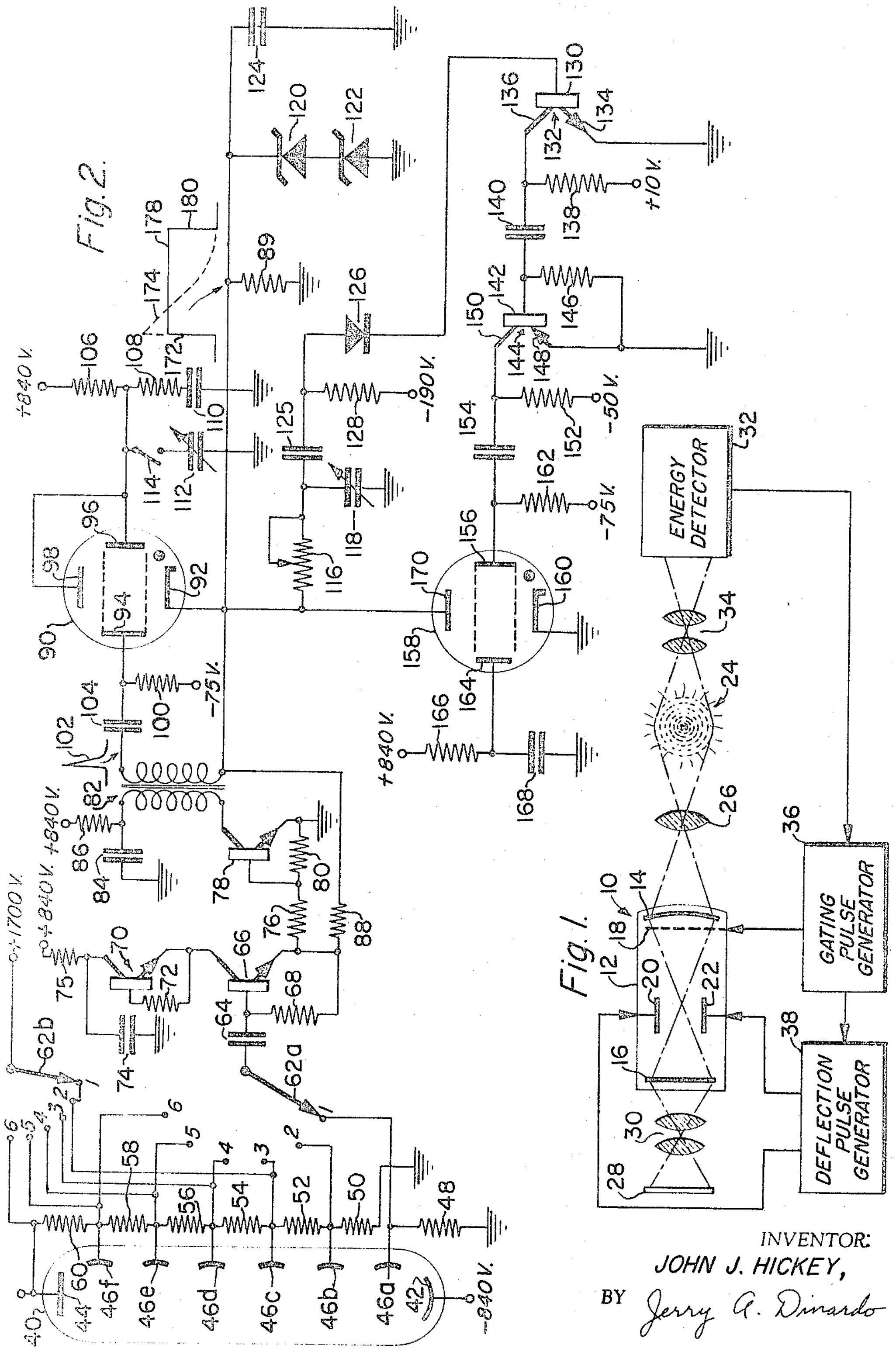

This invention relates to high speed photographic apparatus, and particularly to apparatus for taking pictures of ultra high speed phenomena without losing any appreciable part of the phenomena.

An electronic camera of the image converter type has recently been developed which permits the recording of luminous transient events occurring in the millimicrosecond range, such as events encountered in plasma physics, chemical kinetics, and hypervelocity experiments. With exposure times of less than 3 nanoseconds and a light gain of 50, such a camera is capable of obtaining data which was previously unobtainable.

In applications where the time of occurrence of a given event is known or can be controlled, it is a relatively simple matter to synchronize the actuation of the camera with the occurrence of the event under study. However, in instances where the time of occurrence of the event can not be precisely predetermined, it is necessary to provide some means for recording the event in the shortest possible time after it starts, so that no appreciable part of the event is lost.

Accordingly, an object of this invention is the provision of apparatus for photographing high speed transient events with a minimum part of the event being lost.

Another object is the provision of means for automatically triggering an electronic camera within a minimum time after the start of the high speed event being photographed.

A further object is to provide a circuit for gating on an image converter camera from an optical input, with a total delay time of less than 5 nanoseconds.

The foregoing and other objects are achieved in accordance with one aspect of the invention by employing a gating circuit uniquely arranged to respond in the shortest time possible for any different levels of energy with the event being recorded. One of the components of the circuit comprises an energy detector, such as a photomultiplier, arranged in a switching circuit that applies electrode potentials, for each level of input energy, that are calculated to produce a minimum delay time for the optically generated trigger signal.

The trigger signal generated in the energy detector is fed to a circuit including a high speed, low power, low impedance switching means, such as avalanche transistor means that is used to discharge a first capacitor through a load impedance. The discharge of the first capacitor produces a gating pulse with fast rising leading edge.

Another circuit including a low speed, high power, low impedance switching means, such as a thyratron, is used to discharge another capacitor through the load impedance to maintain the generated pulse at a predetermined voltage level for a duration much longer than that which the low power switching means is capable of providing. Means are provided to shunt the load impedance at a predetermined time to thereby terminate the pulse.

The combination of the high speed, low power switching means and the low speed, high power switching means for discharging capacitors into a common load impedance, is capable of producing rectangular gating pulses having amplitudes of several hundred volts, rise times of less than 2 nanoseconds and pulse widths in excess of 10,000 nanoseconds.

In the drawing:

FIG. 1 is a block diagram of an electronic camera system employing a gating circuit according to the invention; and FIG. 2 is a schematic diagram showing the gating circuit of the invention in more detail.

Referring now to the drawings in which like numerals refer to similar parts, FIG. 1 is a block diagram of an electronic camera system in which the gating circuit according to the invention finds use. The electronic camera system includes as one of its principal components an image converter tube 10 which functions primarily as a high speed shutter. Another function of the image converter tube 10 is that of providing light amplification for the extremely short frame times involved in its high speed photographic operation.

The image converter tube 10 comprises essentially a cylindrical evacuated envelope 12 containing a photoemissive cathode or photocathode 14 at one end, a fluorescent screen 16 at the other end, a control grid 18 adjacent to the photocathode 14, and a pair of deflection plates 20 and 22 intermediate the control grid 18 and the fluorescent screen 16. Certain other parts and components essential to the operation of the tube 10 are omitted for simplicity, since these are well known. For example, the tube 10 ordinarily contains additional electrodes such as an anode and focusing electrodes and also requires a high voltage supply. It will suffice to say that the tube may be one of the kind manufactured by RCA and bearing the tube type number 4449.

In the operation of the electronic camera for the purpose of photographing high speed transient phenomena, light from an object 24 is focused by a lens 26 onto the photocathode 14 of the image converter tube 10. The electron image emitted from the photocathode 14 is normally prevented from reaching the fluorescent screen 16 by the application of a sufficiently high negative blanking voltage to the control grid 18 relative to the photocathode 14.

In operation, a rapid series of frames or exposure of the phenomenon or object 24 can be taken by applying a series of positive rectangular gating voltage pulses to the control grid 18. The gating voltage pulses are sufficiently large, such as 300 volts, to unblank the grid 18 and permit the electron image to be accelerated towards the fluorescent screen 16. The different frames or exposures may be reproduced side-by-side on the fluorescent screen 16 by applying deflection voltages to the deflection plates 20 and 22 respectively, between and during successive gating pulses. The amplified light images appearing on the fluorescent screen 16 are then projected onto a photographic film 28 by means of a lens system 30. In practice, the film 28 may be part of a camera of the type which allows rapid development of the exposed film 28.

Instances may arise when it is desired to photograph a high speed transient event, the exact time of occurrence of which is not determinable. For example, in studying the light emission from a laser it may not be known when the laser first begins to emit after the pumping light is applied. Similarly, in the study of plasma physics, there may be a variable delay between the closing of a switch, to start a train of events which leads to the application of electromagnetic energy to a plasma, and the emission of light from the plasma.

In accordance with one embodiment of the invention, a gating signal for actuating the image converter tube 10 is developed in a circuit which includes an electromagnetic energy detector 32 exposed through a lens system 34 to the phenomenon or object 24 to be recorded. The beginning of the event for example, may be manifested by the initial emission of light from the object 24. In such case, the detector 32 may comprise a photomultiplier tube. Alternatively, the energy used for detection may be a magnetic field, a voltage, a current, a pressure wave, or some other form of energy associated with the phenomenon under study, in which case a detector sensitive to the particular form of energy may be used in conjunction with an appropriate means of coupling the energy to the detector. For example, a piezoelectric crystal may be employed to detect a pressure wave.

Assuming that light energy is to be detected, the light emission is picked up by the detector 32 or photomultiplier tube circuit where it is converted into an electrical impulse. The electrical impulse is fed to a gating pulse generator 36 which generates the desired gating pulses for operating the image converter tube 10. The rectangular gating pulse is fed to the grid 18. Another output of the gating pulse generator 36 is used to trigger a deflection pulse generator 38 which furnishes deflection voltages to the deflection plates 20 and 22.

Since the event under scrutiny itself is used to actuate the image converter tube 10, it will be seen that the time delay developed in the gating circuit including the detector 32, and the gating pulse generator 36, must be kept as short as possible so as not to lose an appreciable part of the event. In accordance with the invention, the gating circuit is designed to actuate the image converter tube 10 within a period of 5 nanoseconds.

FIG. 2 shows in more detail a schematic arrangement of the gating circuit. In the embodiment shown, the detector 32 is one that is responsive to light radiation and is therefore illustrated as consisting of a photomultiplier tube circuit. The detector 32 includes a photomultiplier tube 40 having its cathode 42 connected to a negative voltage supply. For a type 7764 photomultiplier tube, the negative voltage supply may typically be 840 volts.

The first dynode **46*a* is returned to ground through a resistor 48. The anode 44 and the remaining dynodes 46*b*, 46*c*, 46*d*, 46*e*, and 46*f* are connected to various taps of a voltage divider network including resistors 50, 52, 54, 56, 58, 60. The operating voltages on the anode 44 and dynodes 46*b*–46*f* and the particular dynode from which the output signal is taken are selected by a switching arrangement designed to produce the shortest delay time for a given output current at any level of input radiation, such as from the object 24. One switch arm 62*a* selects the output dynode, while another switch arm 62*b* connected to a high positive voltage supply, such as 1700 volts, selects the voltage for the anode 44 and dynodes 46*b*–46*f*. For example, in switch positions 1 and 2, the 1700 volt supply is connected to dynode 46*c*. Dynodes 46*c*, 46*d*, 46*e*, and 46*f* and anode 44 will be at 1700 volts relative to ground, while dynode 46*b* will be at approximately 850 volts. In switch position 1 the output is taken from dynode 46*a* while in switch position 2 the output is taken from dynode 46*b***.

Switch position 1 is used for high levels of input radiation, where a minimum number of multiplication stages is needed to produce the desired output current while switch position 6 is used for low radiation levels where a maximum number of multiplication stages is needed. For each switch position the maximum tube voltage of about 2540 volts is used so that at high levels of input radiation, the switching speed is reduced both by using less dynodes and also by increasing the dynode voltages over and above the value they would have if fixed voltages were applied to the anode and dynodes.

The output signal taken from a selected dynode is fed through the switch arm **62*a* and a coupling capacitor 64 to the base of an avalanche transistor 66, which forms a part of a high speed, low power, low impedance switching circuit. A resistor 68 is connected between the base and emitter of the transistor 66. The collector is connected to the emitter of a second avalanche transistor 70, which has a resistor 72 connected between its base and emitter, and has its collector connected to the high voltage side of a low inductance capacitor 74 charged through a current limiting resistor 75** to a positive potential, such as 840 volts.

The emitter of the first transistor 66 is connected in a first path through a resistor 76 to the base of a third transistor 78, which has a resistor 80 connected between its base and grounded emitter. The collector is connected to the primary winding of a pulse transformer 82. The other side of the primary winding is connected to a capacitor 84 which is charged to a high positive potential, such as 840 volts, through a current limiting resistor 86.

The emitter of the first transistor 66 is also connected in another path through a series resistor 88 and a load resistor 89.

The secondary winding of the pulse transformer 82 is connected in series with the load resistor 89. The output of the transformer 82 is fed to a first gas discharge device or thyratron 90, which forms a part of a low speed, high power, low impedance switching circuit.

The thyratron 90 has a cathode 92, a control electrode 94, a primary anode 96, and a secondary anode 98. In this embodiment the primary and secondary anodes 96 and 98 are connected together and the thyratron 90 is operated as a gas triode. The control electrode 94 is connected to a negative bias source of 75 volts through a bias resistor 100 so that the thyratron is normally nonconducting. The control electrode is adapted to receive a positive trigger pulse 102 from the output of the transformer 82 through a coupling capacitor 104.

The primary anode 96 is connected through a charging resistor 16 to a positive potential of 800 volts. The primary anode 96 is also connected through a discharge circuit including a resistor 108 and a first energy storage device or capacitor 110 to ground. An additional capacitor 112 may be connected between the primary anode 96 and ground through a switch 114 when a relatively high capacitive load is to be driven by the generated pulse.

Between the cathode 92 and ground there is connected a charging circuit including a variable resistor 116 and a second energy storage device or variable capacitor 118. Also connected between the cathode 92 and ground are the load resistor 89 and a voltage limiter or zener diodes 120 and 122. The desired rectangular pulse is generated in the cathode circuit and is used to drive a capacitive load 124 such as the grid circuit of an image converter tube or a cathode ray tube.

The capacitor 118 is coupled through a coupling capacitor 125 to a solid state diode 126 that is back biased to a negative potential of 190 volts through a resistor 128. The solid state diode 126 is connected to the base 130 of an n-p-n transistor 132. The emitter 134 of the transistor 132 is grounded and the collector 136 is connected to a positive potential of 10 volts through a current limiting resistor 138.

The collector 136 of the transistor is coupled through a capictor 140 to the base 142 of a p-n-p transistor 144. A resistor 146 is connected between the base 142 and the grounded emitter 148 of the transistor 144. The collector 150 of the transistor 144 is connected to a negative potential of 50 volts through a current limiting resistor 152.

The collector 150 is coupled through a capacitor 154 to the control electrode 156 of a second thyratron 158.

The second thyratron 158 has its cathode 160 grounded and its control electrode 156 normally biased beyond cutoff by connection to a negative potential of 75 volts through a bias resistor 162. The primary anode 164 is connected to a positive potential of 800 volts through a resistor 166. A capacitor 168 is connected between the primary anode 164 and ground. The charge on capacitor 168 accelerates the initial ionization of the thyratron 158. The secondary anode 170 is connected directly to the cathode 92 of the first thyratron 90.

The operation of the gating circuit will now be described. Prior to the occurrence of the event being photographed, the transistors 66, 70, and 78 are all initially conducting a bias current determined by current limiting resistors 75 and 86 respectively. The bias current is less than that required to cause avalanche breakdown. The capacitor 74 is charged to the sum of the breakdown voltage ($BV_{CER}$) between the collector and emitter of transistor 66 and the breakdown voltage ($BV_{CER}$) between the collector and emitter of transistor 70. In the example given, the voltage on capacitor 74 is about 400 volts. The capacitor 84 is charged to the breakdown voltage ($BV_{CER}$) between the collector and emitter of transistor 78.

Thyratrons 90 and 158 are initially nonconducting. The capacitor 110 is charged to about 840 volts.

When the event being photographed occurs, the light from the object 24 strikes the cathode of the photomultiplier tube 40. A current output from one of the dynodes **46*a*–46*f* selected by the switch 62*a* is coupled through the capacitor 64 to the base of the transistor 66. Transistors 66 and 70 avalanche in quick succession to provide a low impedance discharge path for the capacitor 74. Capacitor 74 discharges into the zener diodes 120 and 122 and load resistor 89 through a series circuit including the transistors 70 and 66, and current limiting resistor 88. The voltage across the load resistor 89 is quickly raised to a level limited by the breakdown voltage of the diodes 120 and 122, to form a pulse with a sharp leading edge 172. In the absence of the zener diodes the voltage pulse would rise to a higher level and then decay with a time constant determined mainly by the circuit values of capacitor 74 and resistor 88, as shown in the dashed line curve 174. Due to the high switching speed of the avalanche transistors 66 and 70 the leading edge 172 will have a fast rise time of less than 2 nanoseconds. However, because of their low power handling capabilities the transistors 66 and 70 can not maintain the output pulse at the desired high level for any appreciable length of time. Accordingly, a high power, lower speed switching circuit such as the thyratron 90** is used to increase the desired pulse duration to a useful width.

The capacitor 74 discharges simultaneously in the path including resistor 88, load resistor 89 and zener diodes 120 and 122, as described above, and in another path including resistor 76 and transistor 78. The discharge current flowing in the latter path causes the transistor 78 to avalanche. The voltage previously appearing across the transistor 78, which was equal to the breakdown voltage between the collector and emitter thereof, is now impressed almost entirely across the primary winding of the pulse transformer 82, giving rise to the voltage pulse 102 in the output winding of the transformer 82.

When the positive trigger pulse, say of 150 volts, is coupled to the control electrode 94 of the first thyratron 90, it raises the control grid 94 voltage above cutoff and causes the thyratron to conduct quickly. The conduction of the first thyratron 90 provides a path for the discharge of the capacitor 110 through the resistor 108. The thyratron 90 constitutes a relatively low speed, high power, low impedance switch. The discharge current flows through the parallel combination including the charging circuit of the variable resistor 116 and variable capacitor 118, the load resistor 89, the load capacitor 124, and the zener diodes 120 and 122. The current flowing into the load resistor 89 maintains the level of the output voltage pulse at the sum of the zener breakdown voltages, to form the flat portion 178. The high current handling capability of the thyratron 90 enables it to conduct high current for a long period of time to extend the pulse duration beyond that permitted by the lower power transistors.

The portion of the discharge current from capacitor 110 flowing itno the capacitor 118 causes the latter to charge towards the 300 volt potential across the zener. diodes 120 and 122, at a rate determined by the time constant of resistor 116 and capacitor 118. The rise in potential of the capacitor 118 is coupled through capacitor 125, to the back biased diode 126. So long as the potential of the capacitor 118 is insufficient to overcome the initial bias level of −190 volts on the diode 126, the output pulse remains at the 300 volt level.

When the potential of capacitor 118 exceeds the bias level on the diode 126, the diode 126 conducts current which flows between the base 130 and the emitter 134 of the transistor 132. The current is amplified first by transistor 132 and then by transistor 144. The voltage developed across resistor 152 in the output of transistor 144 is coupled through capacitor 154 to the control electrode 156 of the second thyratron 158. The coupled voltage is sufficient to overcome the bias on the thyratron 158, causing the latter to conduct. When the thyratron 158 conducts, it brings the primary anode 170 thereof and thus the cathode 72 of the first thyratron 90 down to ground potential, giving rise to the steep trailing edge 180 and thereby terminating the output pulse.

The back bias of the diode 126 is preferably made equal to $$V_z\left(1-\frac{1}{\epsilon}\right)$$

where $V_z$ is the combined zener voltage of the zener diodes 120 and 122 and $\epsilon$ is the base of the natural logarithm. Thus the back bias of the diode 126 is approximately 63% of the combined zener voltages. This will insure that the diode 126 will conduct at a time equal to 1 RC time after the firing of the first thyratron, where RC is the product of resistor 116 and capacitor 118. This is important because the maximum slope at a given time *t*, of a waveform rising exponentially to a fixed amplitude, occurs when RC is equal to *t*. Maximizing the slope at the point where the diode conducts will minimize the time jitter of the circuit.

The RC time constant of the capacitor 118 and resistor 116 and thus the duration of the output pulse can be varied by changing the resistance value of the resistor 116 and the capacitance value of capacitor 118. The RC time constant of resistor 108 and capacitor 110 has to be long enough to sustain current through the zener diodes 120 and 122 to maintain the limited value of voltage thereacross and across the charging circuit comprising resistor 116 and capacitor 118 for the duration of the output pulse.

The circuit of the invention has been successfully operated with the following circuit values:

| | |
|---|---|
| Photomultiplier tube **40** | Type 7764 |
| Resistor **48** | 10K |
| Resistor **50** | 510K |
| Resistor **52** | 510K |
| Resistor **54** | 510K |
| Resistor **56** | 510K |
| Resistor **58** | 510K |
| Resistor **60** | 510K |
| Capacitor **64** ____microfarads | .001 |
| Transistor **66** | Type NS1116 |
| Resistor **68** | 1K |
| Transistor **70** | Type NS1116 |
| Resistor **72** | 1K |
| Capacitor **74** ____picofarads | 2000 |
| Resistor **75** | 2M |
| Resistor **76** | 1K |

| | | |
|---|---|---|
| Transistor 78 | | Type NS1116 |
| Resistor 80 | | 1K |
| Pulse transformer 82 | | [1] Type PE3073 |
| Capacitor 84 | microfarads | .005 |
| Resistor 86 | | 2M |
| Resistor 88 | | 10Ω |
| Resistor 89 | | 100K |
| Thyratron 90 | | Type 2D21 |
| Resistor 100 | | 100K |
| Capacitor 104 | microfarads | .001 |
| Resistor 106 | | 1M |
| Resistor 108 | | 5.1K |
| Capacitor 110 | microfarads | 0.1 |
| Capacitor 112 | picofarads | 0 to 30 |
| Resistor 116 | | 20K |
| Capacitor 118 | picofarads | 10 to 100,000 |
| Diode 120 | | IN989B |
| Diode 122 | | IN989B |
| Capacitor 125 | microfarads | .01 |
| Diode 126 | | IN992B |
| Resistor 128 | | 1M |
| Transistor 132 | | 2N706 |
| Resistor 138 | | 100K |
| Capacitor 140 | microfarads | .001 |
| Transistor 144 | | 2N721 |
| Resistor 146 | | 100K |
| Resistor 152 | | 100K |
| Capacitor 154 | microfarads | .01 |
| Thyratron 158 | | 2D21 |
| Resistor 162 | | 100K |
| Resistor 166 | | 1M |
| Capacitor 168 | picofarads | 30 |

[1] Manufactured by Pulse Engineering, Inc., Santa Clara, Calif.

The embodiments of the invention in which an exclusive property or privilege is claimed are defined as follows:

1. A rectangular pulse generating circuit, comprising:
a first capacitor;
means for charging said first capacitor to a predetermined voltage;
a load impedance;
high speed, low power, low impedance switching means in circuit with said first capacitor and said load impedance and providing a first relatively fast discharge path for said first capacitor for producing the leading edge of a rectangular voltage pulse across said load impedance;
a second capacitor;
means for charging said second capacitor to a predetermined voltage;
low speed, high power, low impedance switching means in circuit with said second capacitor and said load impedance and excluding said low power switching means and providing a second relatively slow discharge path for said second capacitor for lengthening the duration of said voltage pulse;
and means shunting said load impedance for terminating said voltage pulse at a predetermined time.

2. The invention according to claim 1, wherein said high speed, low power, low impedance switching means comprises an avalanche transistor circuit.

3. The invention according to claim 1, wherein said low speed, high power, low impedance switching means comprises a thyratron circuit.

4. The invention according to claim 1, and further including means limiting the amplitude of said voltage pulse to a predetermined amplitude.

5. A high sped electro-optical triggering circuit, comprising:
an energy detector for deriving a trigger signal from an event to be photographically recorded;
a first capacitor;
means for charging said first capacitor to a predetermined voltage;
a load impedance in circuit with said first capacitor;
means responsive to said trigger signal for providing a first low impedance path discharging a portion of said capacitor discharge current through said load impedance to initiate a voltage pulse;
a second discharge path in parall with said low impedance path for receiving another portion of the discharge current from said first capacitor;
a second capacitor in circuit with said load impedance;
means for charging said second capacitor to a predetermined voltage;
said second discharge path including means responsive to said another portion of the discharge current from said first capacitor for providing a second low impedance path discharging said second capacitor through said load impedance to maintain said voltage pulse at a predetermined level;
and means for terminating at a predetermined time said voltage pulse developed across said load impedance.

6. The invention according to claim 5, wherein said first low impedance path includes an avalanche transistor circuit.

7. The invention according to claim 5, wherein said second low impedance path includes a thyratron circuit.

8. The invention according to claim 7, wherein said second discharge path includes an avalanche transistor circuit, the output of which is coupled to the input of said thyratron circuit.

9. A rectangular pulse generating circuit, comprising:
a first capacitor;
means for charging said first capacitor to a predetermined voltage;
a load impedance in circuit with said first capacitor;
means responsive to a trigger signal for providing a first low impedance path discharging a portion of said capacitor discharge current through said load impedance to initiate a voltage pulse;
a second discharge path in parallel with said low impedance path for receiving another portion of the discharge current from said first capacitor;
a second capacitor in circuit with said load impedance;
means for charging said second capacitor to a predetermined voltage;
said second discharge path including means responsive to said another portion of the discharge current from said first capacitor for providing a second low impedance path discharging said second capacitor through said load impedance to maintain said voltage pulse at a predetermined level;
and means for terminating at a predetermined time said voltage pulse developed across said load impedance.

10. A rectangular pulse generating circuit, comprising:
a first capacitor;
means for charging said first capacitor to a predetermined voltage;
a load impedance;
high speed, low power, low impedance switching means in circuit with said first capacitor and said load impedance and providing a first relatively fast discharge path for said first capacitor for producing the leading edge of a rectangular voltage pulse across said load impedance;
a second capacitor;
means for charging said second capacitor to a predetermined voltage;
thyratron circuit means in circuit with said second capacitor and said load impedance and providing a second relatively slow discharge path for said second capacitor for lengthening the duration of said voltage pulse;

and means shunting said load impedance for terminating said voltage pulse at a predetermined time.

References Cited

UNITED STATES PATENTS

| | | | |
|---|---|---|---|
| 3,017,519 | 1/1962 | Gill | 307—88.5 |
| 3,100,872 | 8/1963 | Hickey et al. | 328—67 |
| 3,273,075 | 9/1966 | Kennedy | 331—87 |

OTHER REFERENCES

"On the Use of 2N504 Transistors in the Avalanche Mode for Nuclear Instrumentation," by Ralph Fullwood. The Review of Scientific Instruments, vol. 31, November 1960.

ARTHUR GAUSS, *Primary Examiner.*

R. H. EPSTEIN, *Assistant Examiner.*